United States Patent
Jean et al.

(10) Patent No.: US 6,917,669 B1
(45) Date of Patent: Jul. 12, 2005

(54) PROCESSES AND SYSTEMS FOR MANAGING TESTING OF COMMUNICATIONS SYSTEMS

(75) Inventors: David R. Jean, Birmingham, AL (US); Judy M. Marcopulos, Duluth, GA (US); Rita H. Scherer, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/946,266

(22) Filed: Sep. 4, 2001

(51) Int. Cl.[7] .............................. H04M 1/24; H04M 3/22
(52) U.S. Cl. ............................... 379/29.05; 379/10.01; 379/9.03; 379/29.09; 379/27.04
(58) Field of Search .............................. 379/1.01, 9.01, 379/9.02, 9.03, 9.04, 14.01, 22.03, 27.01, 27.04, 29.01, 29.09, 29.1, 29.05, 10.01, 10.02, 10.03, 15.01, 15.02, 15.03, 22.04, 25, 27.03, 29.08; 370/241, 242, 244, 247, 250, 251

(56) References Cited

U.S. PATENT DOCUMENTS

| | | | |
|---|---|---|---|
| 4,464,543 A | | 8/1984 | Kline et al. |
| 5,155,761 A | | 10/1992 | Hammond .................. 379/67 |
| 5,285,494 A | | 2/1994 | Sprecher et al. |
| 5,406,616 A | | 4/1995 | Bjorndahl .................. 379/59 |
| 5,689,550 A | | 11/1997 | Garson et al. |
| 5,784,438 A | | 7/1998 | Martinez .................... 379/89 |
| 5,790,633 A | * | 8/1998 | Kinser, Jr. et al. ............ 379/10 |
| 5,793,771 A | | 8/1998 | Darland et al. ............. 370/467 |
| 5,946,372 A | * | 8/1999 | Jones et al. .................. 379/10 |
| 5,946,373 A | * | 8/1999 | Harris ........................ 379/26 |
| 5,956,024 A | | 9/1999 | Strickland et al. |
| 6,006,171 A | * | 12/1999 | Vines et al. ................ 702/184 |
| 6,018,567 A | | 1/2000 | Dulman |
| 6,032,039 A | | 2/2000 | Kaplan ....................... 455/413 |
| 6,173,047 B1 | | 1/2001 | Malik .......................... 379/207 |
| 6,175,859 B1 | | 1/2001 | Mohler ....................... 709/206 |
| 6,289,382 B1 | | 9/2001 | Bowman-Amuah |
| 6,295,540 B1 | * | 9/2001 | Sanschagrin et al. ....... 707/102 |
| 6,353,902 B1 | * | 3/2002 | Kulatunge et al. .......... 714/712 |
| 6,401,090 B1 | | 6/2002 | Bailis et al. |
| 6,445,774 B1 | | 9/2002 | Kidder et al. ............... 379/9.03 |
| 6,446,123 B1 | * | 9/2002 | Ballantine et al. .......... 709/224 |
| 6,493,694 B1 | | 12/2002 | Xu et al. |
| 6,614,882 B1 | * | 9/2003 | Beamon et al. ........... 379/27.01 |
| 6,636,486 B1 | | 10/2003 | Magloughlin |
| 2001/0029504 A1 | | 10/2001 | O'Kane, Jr. et al. |
| 2003/0069797 A1 | | 4/2003 | Harrison |

FOREIGN PATENT DOCUMENTS

WO  WO 02/45393 A2   6/2002

OTHER PUBLICATIONS

"BellSouth MemoryCall VoiceMail Services", www.bellsouth.com, Mar. 7, 2001, 3 pages.
"Computerized Call Return Feature", IBM Technical Disclosure, Apr. 1986, Feb. 26, 2001, pp. 4897–4901.

(Continued)

*Primary Examiner*—Rexford Barnie
(74) *Attorney, Agent, or Firm*—Cantor Colburn LLP

(57) ABSTRACT

Processes and systems are disclosed for managing a request for a test of a communication system. One embodiment communicates with a communications network and acquires the request. The request may be annotated with at least one of a date, a time, and an origin of the request. The embodiment formats the request with testability data desired by a test system conducting the test of the communication system. The formatted request is submitted to the test system, and then the results of the test are acquired. The embodiment distributes the results, wherein the process manages requests and results for tests of the communication system.

45 Claims, 16 Drawing Sheets

OTHER PUBLICATIONS

Fajman, R., "An Extensible Message Format for Message Disposition Notifications", www.faqs.org, Mar. 7, 2001, 21 pages.

"Impact Voice Mail Server Deluxe", www.blackice.com, Mar. 19, 2001, 5 pages.

Rosenberg, Arthur and David Zimmer, "IP Infrastructure: The Fastest Track for Tomorrow's Unified Communications", The Unified View, Sep. 2000, pp. 1–16.

Vaudreuil, G. et al., "Voice Profile for Internet Mail–version 2", www.faqs.org, Mar. 19, 2001, 39 pages.

* cited by examiner

PROCESSES AND SYSTEMS FOR MANAGING TESTING OF COMMUNICATIONS SYSTEMS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyright whatsover.

BACKGROUND OF THE INVENTION

1. Field of the Invention

This invention generally relates to telephony and, more particularly, to processes and systems for managing and controlling test requests and test results.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of millions of copper cables and wires. Each of these copper cables must be maintained to provide superior telephone service to the customer.

Yet maintaining these copper cables and wires is an extraordinary task. The Public Switched Telephone Network, with its millions of copper cables and wires, may receive hundreds of maintenance calls per day. These maintenance calls, in turn, may result in hundreds of maintenance work orders. A single cable fault, for example, may sever telephone service to hundreds of customers. Construction crews can inadvertently severe telephone service to hundreds of customers. Storms, floods, and other natural disasters can interrupt telephone service and require thousands of man-hours of restoration. Even common, everyday exposure to ozone, summer heat, winter cold, and water can deteriorate and degrade copper cables and wires. These hundreds of daily maintenance calls, and the resultant work orders, must be efficiently managed to prevent maintenance costs from eroding profits.

Test verification is one problem to efficient work order management. Testing is used to verify a problem exists within the communication/telephone system. Before a work order is created, for example, a customer representative may request an automated test, such as a mechanized loop test, to verify the customer's complaint. With hundreds of daily maintenance calls, however, the corresponding number of requests for test verification soon creates a backlog. As the backlog grows, there is no method of prioritization. Older, or less important, requests may be intermixed with urgent, high priority requests. This lack of prioritization often means that automated testing time is wasted on less important, or even unimportant, requests, thus creating inefficient test management practices.

Another problem with test verification is inaccurate testability data. The automated test often requires some type of testability data to verify a problem within the communication system. The mechanized loop test, for example, requires fresh telephone line records for an accurate verification of a problem. An automated test of a fiber optic network would also require fresh data describing the current optical network configuration. This testability data, however, is maintained in static databases that require manual updating. Because this manual updating is often a slow process, the testability data rarely reflects fresh information. Even if the testability data is fresh, the manual updates are prone to human error. The testability data, therefore, is often outdated and irrelevant and thus creating inefficient test management practices.

The outdated, inaccurate testability data creates a further cascade toward error. When the testability data is old, or known to be inaccurate, the automated test may reject the testability data. If the automated test rejects the testability data, the testability data must be manually updated. The manual update, slow and prone to human error, further delays the request. These test management practices further cascade toward inefficiency.

There is, accordingly, a need in the art for test management systems that prioritize requests for tests of communication systems, that dynamically and accurately provide testability data for tests of communications systems, that reduce the need for manual updates, and that reduce the costs of communication system testing.

BRIEF SUMMARY OF THE INVENTION

The aforementioned problems are reduced by a Test Manager module. The Test Manager module comprises processes that may be implemented in a computer program. The Test Manager module acquires a test request for a communication system. The Test Manager module may then annotated the test request with at least one of a date, a time, and an origin of the request. If the test request also requires testability data, the Test Manager module acquires fresh, accurate testability data. The Test Manager module sends the annotated test request, and/or the fresh testability data, to a test system conducting the test. Once the test is complete, the Test Manager module acquires the results. The Test Manager module may even distribute the results back to an originating user or other system.

The Test Manager module prioritizes test requests. The Test Manager module annotates the test request with at least one of a date, a time, and an origin of the request. If the Test Manager module receives multiple test requests for the same test, the Test Manager module may then prioritize according to the date, the time, or even the origin of the test request. The Test Manager module, for example, could sort test requests according to the originator of the test request and there prioritize among the originator(s). The Test Manager module, even more simply, could chronologically prioritize the test requests. If a backlog of test requests develops, the Test Manager now has a structured method of efficiently managing and prioritizing the test requests.

The Test Manager module also controls communication with the test system. The Test Manager module sends the annotated test request, and/or the fresh testability data, to the test system conducting the test. Because there are often multiple, different test systems, the Test Manager module determines which test system is requested. The Test Manager module also then determines how the annotated test request, and the testability data, is routed to the test system. Because the test request has also been annotated with an origin/originator of the test request, the Test Manager module may even route the test results back to the origin/originator. The Test Manager module thus controls and manages communication with the desired test system.

The Test Manager module also creates more accurate testability data. The Test Manager module acquires information from dynamically-updated sources. Because the Test Manager module acquires information from dynamically-updated sources, the Test Manager module reduces reliance upon static databases of outdated information. Because the Test Manager module acquires information from dynamically-updated sources, the Test Manager module also reduces the need to manually update records. The Test Manager module thus reduces the errors that degrade manually-entered information. The Test Manager module thus creates testability data comprised of the freshest data available.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
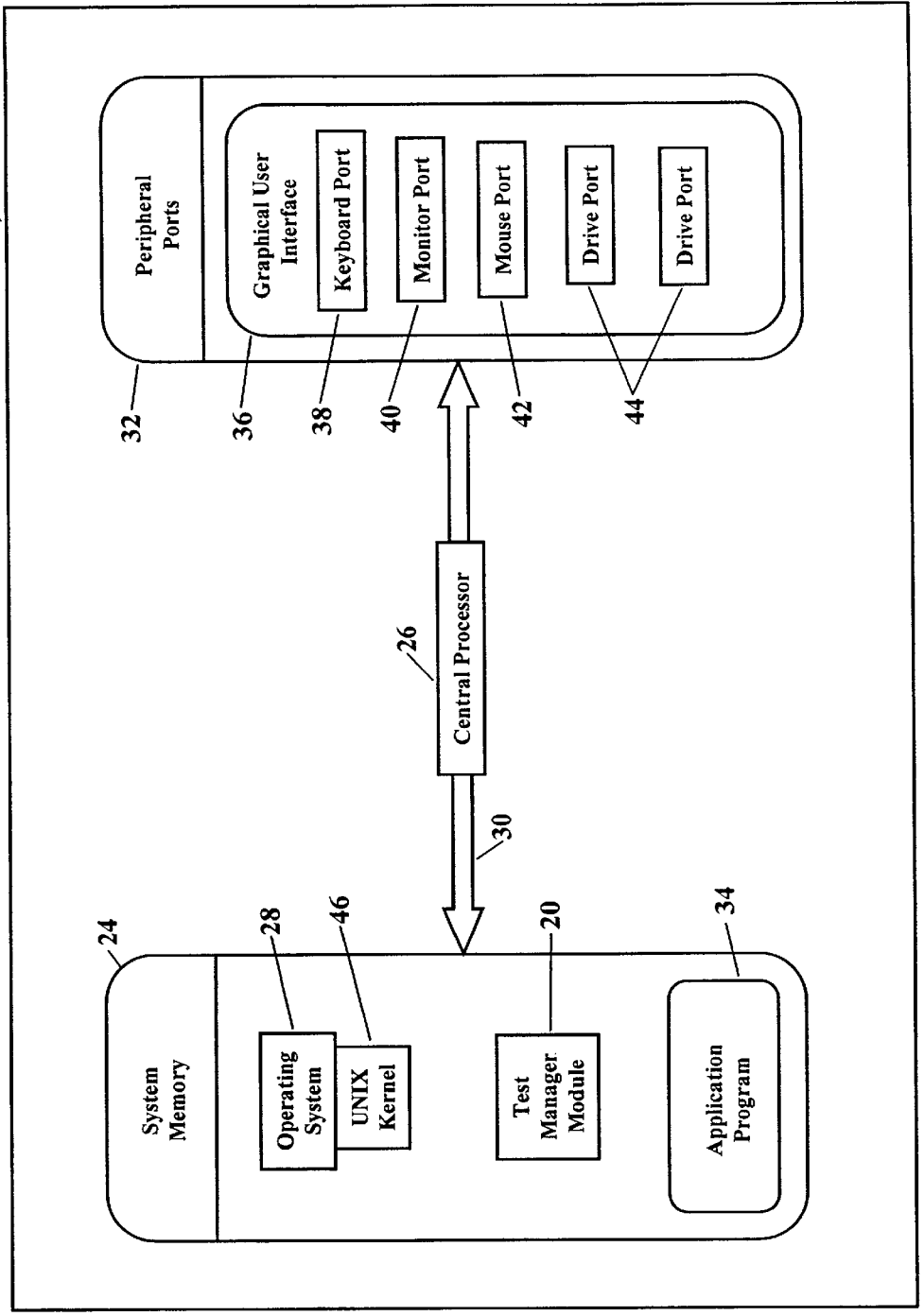
FIG. 1 is a block diagram showing the Test Manager module 20 residing in a computer system 22.

The present invention particularly relates to processes and systems for managing and controlling test requests and test results. One embodiment communicates with a communications network and acquires the request. The request may be annotated with at least one of a date, a time, and an origin of the request. The embodiment formats the request with testability data desired by a test system conducting the test of the communication system. The formatted request is submitted to the test system, and then the results of the test are acquired. The embodiment distributes the results, wherein the process manages requests and results for tests of the communication system.

An alternative embodiment describes a process of managing a request for a mechanized loop test of a telephone system. The process communicates with a communications network and acquires the request. The request is annotated with at least one of a date, a time, and an origin of the request. The request is prioritized according to at least one of the date, the time, and the origin. The process formats the request with telephone line records desired by the mechanized loop test. The formatted request is submitted to the mechanized loop test, and the results are acquired. The results are distributed, wherein the process manages communication between the request and the mechanized loop test.

Another embodiment describes a process of managing a request for a test of a communication system. This embodiment communicates with a communications network and acquires the request. An originator of the request is determined. The process also determines which test system is required to conduct the test. The request is formatted with testability data required by the test system. A routing to the test system is also determined. The request is routed to the test system over the communications network. The results of the test are acquired and compared to the testability data to determine trouble in the communication system. The results are distributed, wherein the process manages requests and results for tests of the communication system.

Another aspect discloses a process of managing a request for a mechanized loop test of a telephone system. This aspect communicates with a communications network, acquires the request, and determines at least one of a date, a time, and an originator of the request. The request is prioritized according to at least one of the date, the time, and the originator of the request. The request is formatted with telephone line record data required by the mechanized loop test. A routing to the mechanized loop test is determined, and the request is routed to the mechanized loop test. The results of the mechanized loop test are acquired and compared to the telephone line record data to determine trouble in the telephone system. The results are distributed, wherein the process manages requests and results for mechanized loop tests of the telephone system.

Still a further aspect describes a process of managing a request for a test of a communication system. This aspect communicates with a communications network and acquires the request. An originator of the request, and which test system is required to conduct the test, is determined. A routing to the test system is determined, and the request is routed to the test system. A testability data request is received from the test system, with the testability data request requesting testability data required by the test system. This aspect communicates with the communications network and sends the testability data to the test system. The results of the test are acquired and compared to the testability data to determine trouble in the communication system. The results are distributed, wherein the process manages requests and results for tests of the communication system.

Another aspect discloses a process of managing a request for a mechanized loop test of a telephone system. This process communicates with a communications network and acquires the request. An originator of the request, and a routing to the mechanized loop test, is determined. The request is routed to the mechanized loop test. The process receives a line records request from the mechanized loop test, with the line records request requesting telephone line records required by the mechanized loop test. The telephone line records are sent to the mechanized loop test, and results of the mechanized loop test are acquired. The results are compared to the telephone line records to determine trouble in the telephone system, and the results are distributed, wherein the process manages requests and results for mechanized loop tests of the telephone system.

A further embodiment discloses a system for managing a request for a mechanized loop test of a telephone system. The system has a Test Manager module and a processor. The Test Manager module communicates with a communications network, acquires the request, and prioritizes the request according to at least one of a date, a time, and an origin of the request. The Test Manager module submits the request to the mechanized loop test, and the Test Manager module distributes results of the mechanized loop test. The processor is capable of processing the acquired request and of controlling the request and the results.

A computer program product is disclosed for managing a request for a mechanized loop test of a telephone system. This computer program product has a computer-readable medium and a Test Manager module stored on the medium. The Test Manager module communicates with a communications network and acquires the request. The Test Manager module prioritizes the request according to at least one of a date, a time, and an origin of the request. The Test Manager module submits the request to the mechanized loop test, and the Test Manager module distributes results of the mechanized loop test.

Figure 2:
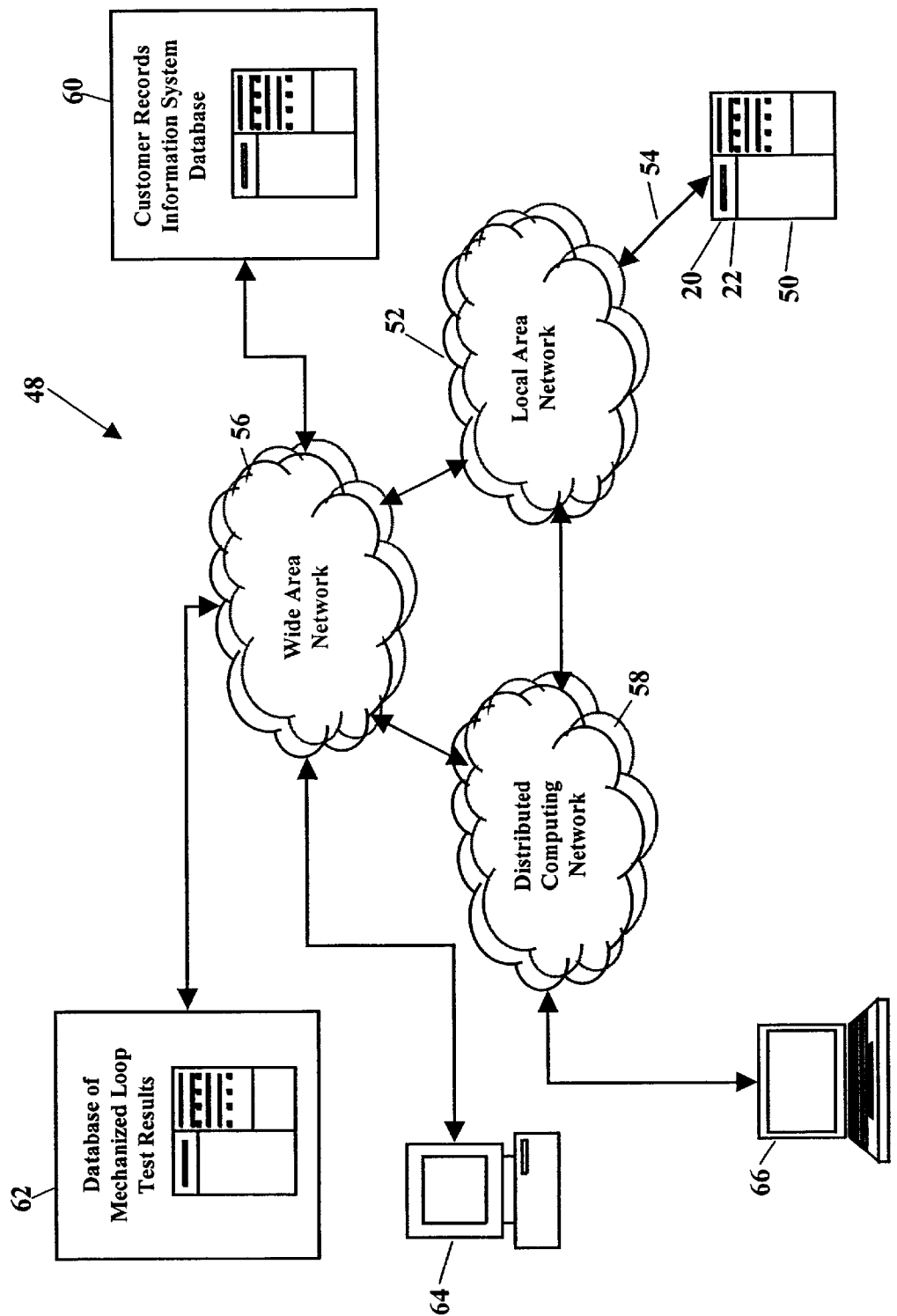
FIG. 2 is a block diagram of a communications network 48 representing the operating environment for the Test Manager module 20.

FIGS. 1 and 2 depict a possible operating environment for an embodiment of the present invention. This embodiment of a Test Manager module 20 comprises a computer program that acquires information and manages test requests of communications systems. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Test Manager module 20 residing in a computer system 22. The Test Manager module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). While only one microprocessor is shown, those skilled in the art also recognize multiple processors may be utilized. Those skilled in the art further understand that the program, processes, methods, and systems described in this patent are not limited to any particular manufacturer's central processor.

The preferred operating system 28 is the UNIX® operating system (UNIX® is a registered trademark of the Open Source Group, www.opensource.org). Those skilled in the art also recognize many other operating systems are suitable. Other suitable operating systems include UNIX-based Linux, WINDOWS NT® (WINDOWS NT® is a registered trademark of Microsoft Corporation, One Microsoft Way, Redmond Wash. 98052-6399, 425.882.8080, www.Microsoft.com), and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill will understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a block diagram of a communications network 48. This communications network 48 further represents an operating environment for the Test Manager module 20. The Test Manager module 20 resides within the memory storage device (shown as reference numeral 24 in FIG. 1) in the computer system 22. The computer system 22 is conveniently shown as a computer server 50, however, the Test Manager module 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Test Manager module 20 to request and acquire information from many computers connected to the Local Area Network 52, the Wide Area Network 56, and the globally-distributed computing network 58.

As FIG. 2 shows, the Test Manager module 20 sends and receives information to/from many other computers connected to the communications network 48. The Test Manager module 20, for example, may acquire customer information from a server maintaining a Customer Records Information System (CRIS) 60. The Test Manager module 20 may also acquire test results from a server maintaining a database 62 of mechanized loop test results. The Test Manager module 20 may also communicate information over the communications network 48 to a user at a user computer 64. FIG. 2 even shows that remote users, such as programmers and engineers, may use a portable computer 66 to access the communications network 48 and remotely access the Test Manager module 20. Because many computers may be connected to the communications network 48, computers and computer users may share and communicate a vast amount of information.

Figure 3:
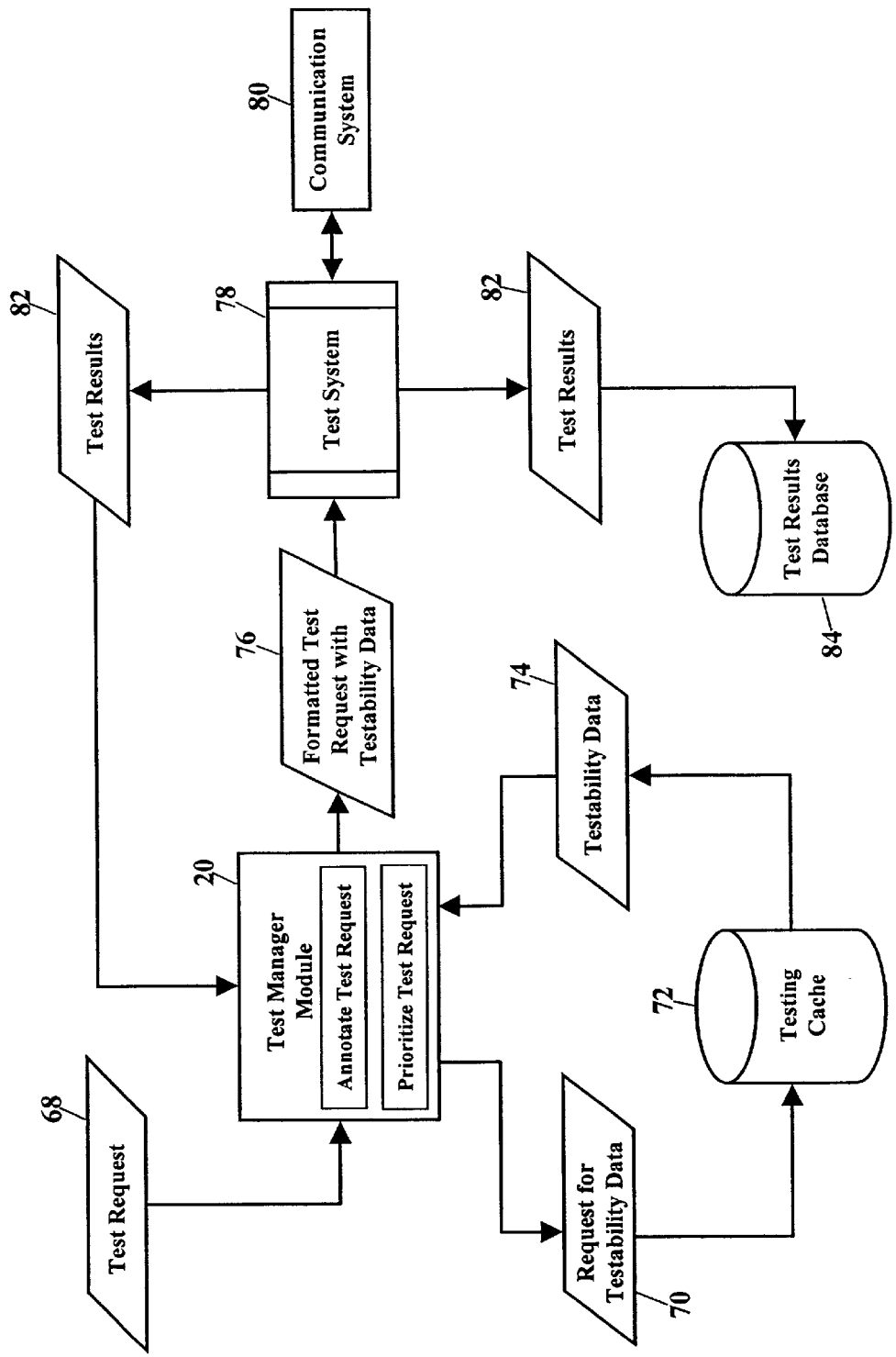
FIG. 3 is a block diagram showing one embodiment of the Test Manager module 20.

FIG. 3 is a block diagram showing one embodiment of the Test Manager module 20. The Test Manager module 20, in this embodiment, is a computer program that acquires information from the communications network (shown as reference numeral 48 in FIG. 2) and uses this information to manage test requests of a communication system. As FIG. 3 illustrates, the Test Manager module 20 communicates with the communications network and acquires a test request 68. The test request 68 originates from a user or another system interfacing with the Test Manager module 20. The Test Manager module 20 annotates the test request with at least one of a date, a time, and the originating user or system of the test request 68. If the Test Manager 20 receives multiple test requests, the Test Manager could use the annotated date, time, or originator to prioritize the multiple test requests.

The test request 68 may require testability data. Some tests of communications systems require that the test request 68 contain testability data. If the test request 68 requires testability data, a request 70 for testability data is communicated along the communications network to a testing cache 72. If the testing cache 72 contains the requested information, the Test Manager 20 communicates with the communications network and acquires testability data 74. The Test Manager 20 formats the test request 68 with the testability data 74 and sends a formatted test request 76 to a test system 78. The test system 78 performs the requested test of the communications system 80, and the test system 78 acquires test results 82. The Test Manager 20 communicates with the communications network and acquires the test results 82. The test results 82 may also be stored in a test results database 84 for quick retrieval at a later time. The Test Manager module 20 then distributes the test results 82 along the communications network back to the originating user or system of the test request 68.

The testability data 74 may be specific to the test system 78. The testability data 74, for example, may represent telephone line records for a mechanized loop test of a telephone system physical loop. The testability data 74 could also represent telephone line records for a digital subscriber line test system. The testability data 74 may represent optical network configuration data, air pressure data, optical switch data, jumper data, multiplexer data, or facility data for fiber optic communications systems. The testability data 74 may include any information the test system 78 requires to conduct a test of the communication system 80.

Figure 4:
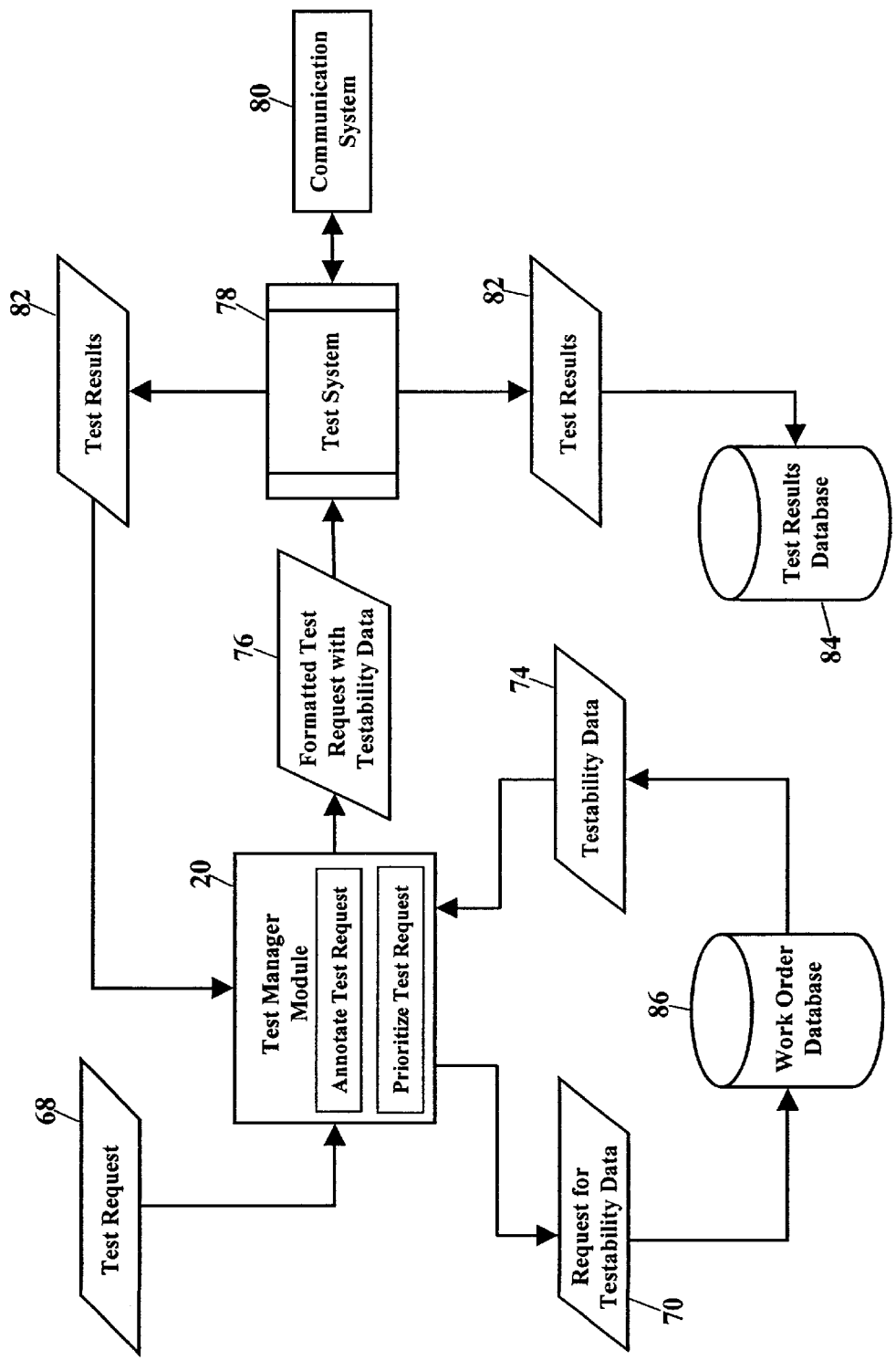
FIGS. 4–12 are block diagrams showing alternative embodiments of the Test Manager module 20.

FIG. 4 is a block diagram showing an alternative embodiment of the Test Manager module 20. Here the Test Manager module 20 communicates the request 70 for testability data to a work order database 86. If the testing cache (shown as reference numeral 72 in FIG. 3) does not contain the testability data 74, the Test Manager 20 may alternatively acquire the testability data 74 from the work order database 86. The work order database 86 is a database of recently-created work orders. The Test Manager 20 may quickly check the work order database 86 for a recently-created work order already having the testability data 74. The Test Manager 20 communicates with the communications network and acquires the testability data 74. The Test Manager 20 formats the test request 68 with the testability data 74 and sends the formatted test request 76 to the test system 78. The test system 78 performs the requested test, and the Test Manager 20 acquires the test results 82. The Test Manager module 20 then distributes the test results 82 along the communications network back to the originating user or system of the test request 68.

Figure 5:
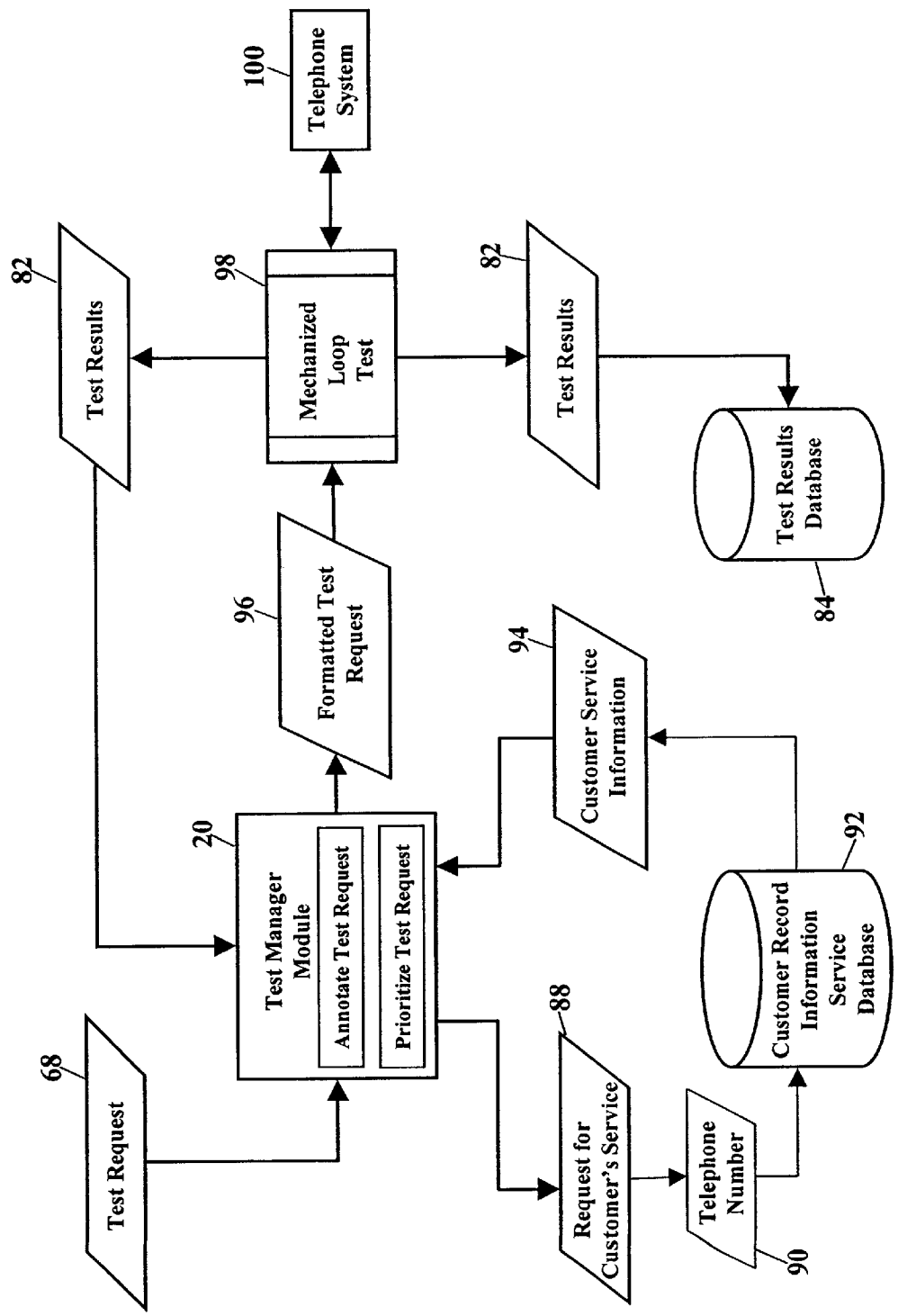
Figure 6:
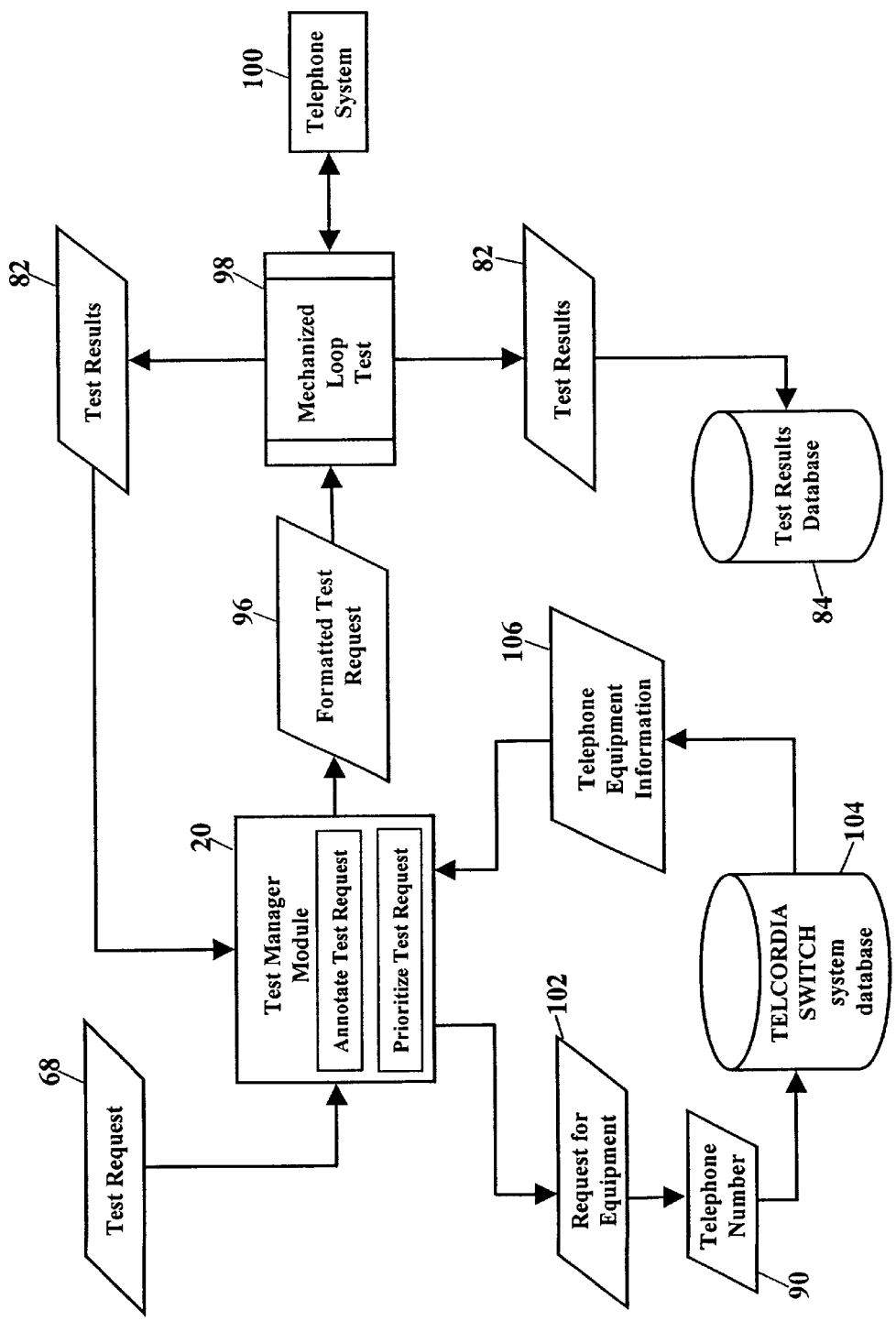
Figure 7:
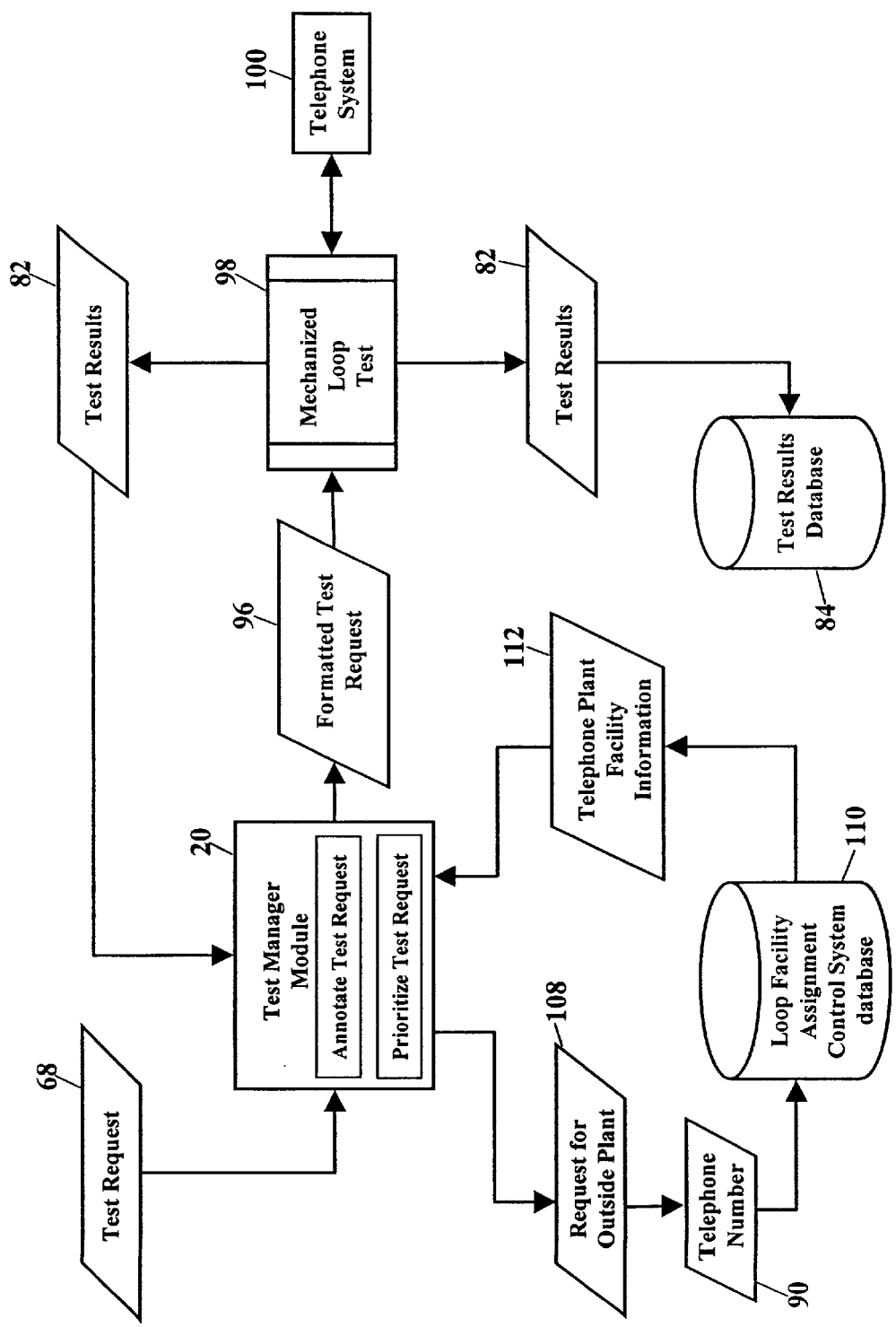

FIGS. 5–7 are block diagrams showing still other alternative embodiments of the Test Manager module 20. These alternative embodiments are configured for acquiring telephone line records for a mechanized loop test. The Test Manager module 20 communicates with the communications network and acquires the test request 68. Because the test request 68 requests a mechanized loop test of a telephone system local loop, the Test Manager module 20 may then request customer information, facility information, and terminal equipment information to assemble a telephone line record. The assembly of this telephone line record is more fully shown and described in U.S. application Ser. No. 09/946,405, filed concurrently herewith, entitled METHODS AND SYSTEMS FOR ASSEMBLING TELEPHONE LINE RECORDS, and incorporated herein by reference in its entirety.

FIG. 5 shows the Test Manager module 20 issuing a request 88 for the customer's service. This request 88 for the customer's service may also contain a telephone number 90 for which the customer's service information is sought. The request 88 for the customer's service is communicated over the communication network (shown as reference numeral 48 in FIG. 2) to a Customer Record Information Service (CRIS) database 92. The Customer Record Information Service database 92 retrieves customer service information 94 associated with the telephone number 90. The Test Manager module 20 acquires the customer service information 94, formats the test request 68 with the customer service information 94, and sends a formatted test request 96 to a mechanized loop test 98. The mechanized loop test 98 performs the requested mechanized loop test of a telephone system 100. The Test Manager 20 communicates with the communications network and acquires the test results 82. The Test Manager module 20 may then analyze the trouble and possibly determine the location of the trouble. The Test Manager module 20 distributes the test results 82 along the communications network and back to the originating user cr system of the test request 68.

The customer service information 94 describes many aspects of the customer's telephone service. The customer service information 94 may include the listed name for the telephone number 90, a service address for the telephone number 90, a location for the telephone number 90, and the working conditions associated with the telephone number 90. The customer service information 94 may also include the class of service for the telephone number 90, listing information for the telephone number 90, port status information for the telephone number 90, and location route number information for the telephone number 90. The customer service information 94 could also include the local office associated with the telephone number 90, an exchange associated with the telephone number 90, a foreign office associated with the telephone number 90, the local telephone service provider, and the service rate associated with the telephone number 90. The customer service information 94 could include caller identification service associated with the telephone number 90, local usage associated with the telephone number 90, the wire maintenance center associated with the telephone number 90, any essential services associated with the telephone number 90, and whether coin-operated equipment is associated with the telephone number 90. The customer service information 94 could also include billing information for the telephone number 90, payments records for the telephone number 90, and call logs for the telephone number 90. The customer service information 94 could even include special language needs (e.g., French or Spanish) and cultural differences (e.g., religious holidays and customs). The customer service information 94, in short, represents any information that helps telephone service providers identify the customer and the customer's telephone service.

The Test Manager module 20 operates in real time. Because the Test Manager module 20 may issue the request 88 for the customer's service in response to each test request 68, the formatted test request 96 contains the freshest data possible. The Test Manager module 20 is not extracting old data from a static source. The Test Manager module 20 interfaces with the Customer Record Information Service (CRIS) database 92. The Customer Record Information Service database 92 is dynamically updated, so the Test Manager module 20 acquires the latest, most correct customer service information 94. The Test Manager module 20 reduces the instances of out-dated and corrupt line records. The mechanized loop test 98 thus performs the test with real time, accurate customer service information 94.

FIG. 6 shows the Test Manager module 20 issuing a request 102 for equipment associated with the telephone number 90. The request 102 for equipment is communicated over the communication network (shown as reference numeral 48 in FIG. 2) to a switch system database 104. One such switch system database is the TELCORDIA™ SWITCH™ system (TELCORDIA™ and SWITCH™ are trademarks of Telcordia Technologies, Inc., 445 South St., Morristown N.J. 07960, www.telcordia.com). As those of ordinary skill recognize, the SWITCH™ system is an operations support system that provides inventory and assignment support for central office switching equipment and related facilities. Although the SWITCH™ system provides many services, one service of the SWITCH™ system is to inventory and administer telephone equipment and telephone numbers. The TELCORDIA™ SWITCH™ system database 104 retrieves telephone equipment information 106 associated with the telephone number 90. The telephone equipment information 106 describes what telephone equipment is associated with the telephone number 90. The telephone equipment information 106 may describe terminal equipment, central office equipment, and other telephone-related equipment. The Test Manager module 20 acquires the telephone equipment information 106, formats the test request 68 with the telephone equipment information 106, and sends the formatted test request 96 to the mechanized loop test 98. The mechanized loop test 98 performs the requested mechanized loop test of the telephone system 100. The Test Manager 20 communicates with the communications network and acquires the test results 82. The Test Manager module 20 may then analyze the trouble and possibly determine the location of the trouble. The Test Manager module 20 distributes the test results 82 along the communications network and back to the originating user or system of the test request 68.

The TELCORDIA™ SWITCH™ system is currently the preferred source of the telephone equipment information 106. While another vendor's and system may provide the same, or similar, terminal equipment information, the TELCORDIA™ SWITCH™ system is currently used in the preferred embodiment. As those of ordinary skill recognize, other vendors and other systems may also provide suitable alternatives to the TELCORDIA™ SWITCH™ system.

FIG. 7 shows the Test Manager module 20 issuing a request 108 for outside local loop plant facility information associated with the telephone number 90. The request 108 for outside local loop plant facility information is communicated over the communication network (shown as reference numeral 48 in FIG. 2) to a Loop Facility Assignment Control System (LFACS) 110. The Loop Facility Assignment Control System 110 retrieves telephone plant facility information 112 associated with the telephone number 90. The Test Manager module 20 acquires the telephone plant facility information 112, formats the test request 68 with the telephone plant facility information 112, and sends the formatted test request 96 to the mechanized loop test 98. The Test Manager 20 acquires the test results 82 and possibly determines the location of the trouble. The Test Manager module 20 then distributes the test results 82.

The telephone plant facility information 112 describes many aspects of the telephone system local loop physical plant. The telephone plant facility information 112, for example, may include the cable and line pair associated with the telephone number 90. The telephone plant facility information 112 may also include the F1 and F2 lines associated with the telephone number 90, a cross-connect box associated with the telephone number 90, a terminal associated with the telephone number 90, and, if needed, even a utility pole associated with the telephone number 90. The telephone plant facility information 112 could also include a universal service order code, a terminal address, and a remote terminal associated with the telephone number 90. The telephone plant facility information 112 could include any information that describes telephone system physical plant characteristics.

Figure 8:
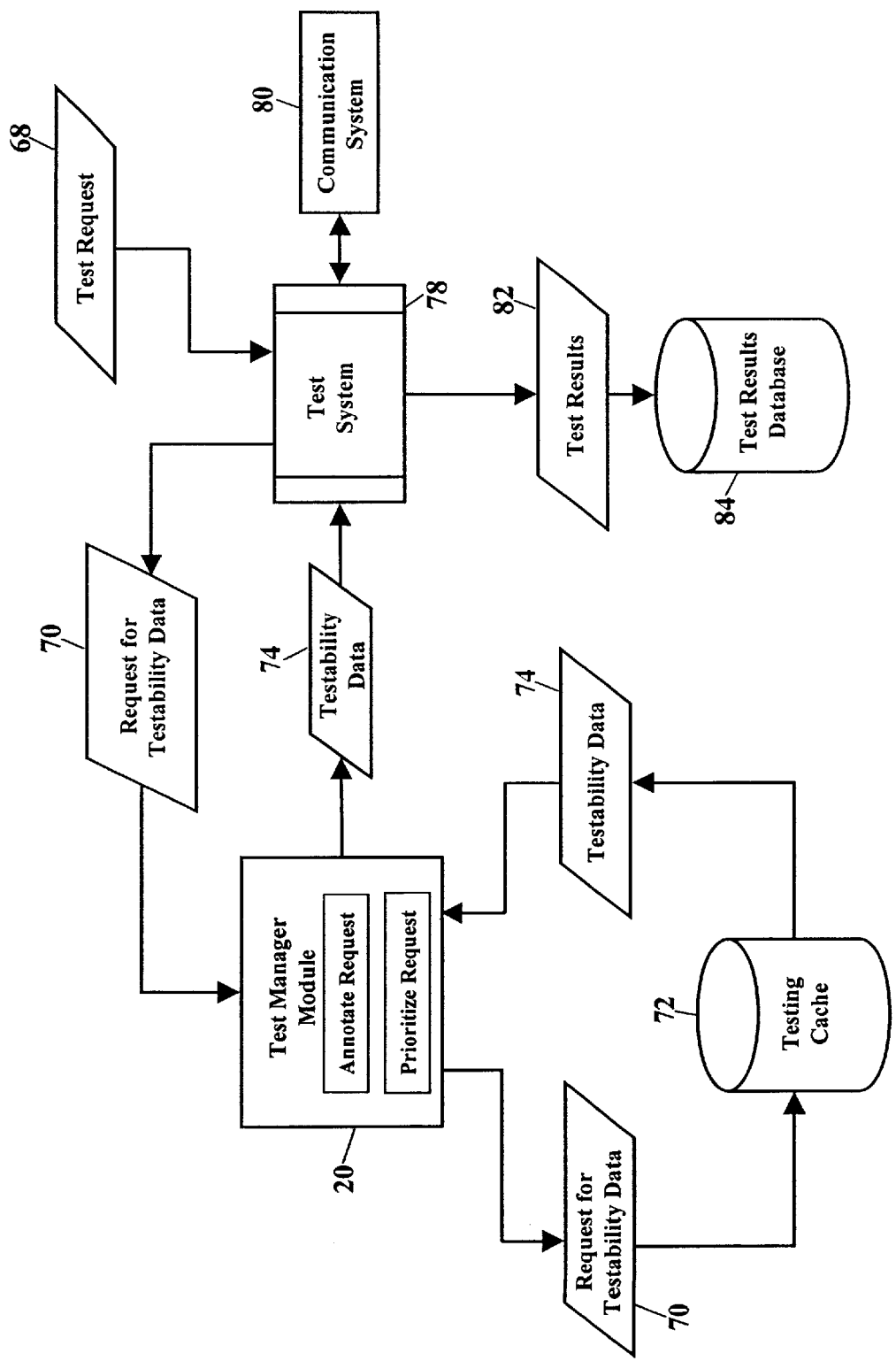
Figure 9:
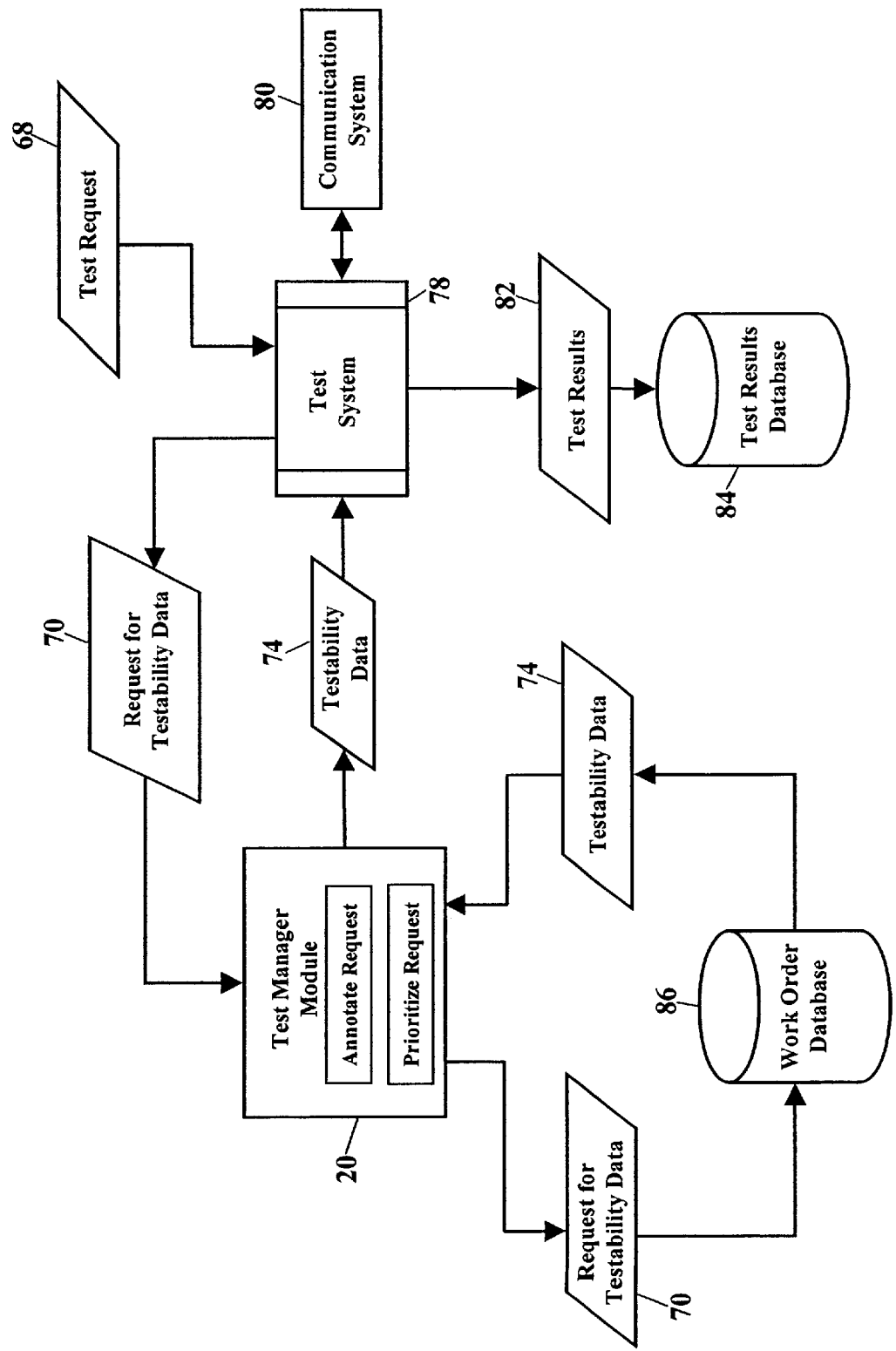

FIGS. 8 and 9 are block diagrams showing still other alternative embodiments of the Test Manager module 20. Here, however, the test request 68 is received by the test system 78. If the test system 78 requires the testability data 74, the test system 78 issues the request 70 for testability data. The Test Manager module 20 communicates with the communications network (shown as reference numeral 48 in FIG. 2) and acquires the request 70 for testability data. The Test Manager module 20 may, as before, annotate the request 70 for testability data with at least one of the date, the time, and the originating user or system of the test request 68. The Test Manager could also use the annotated date, time, or originator to prioritize the multiple test requests. FIG. 8 shows the request 70 for testability data is communicated along the communications network to the testing cache 72. If the testing cache 72 contains the requested information, the Test Manager 20 communicates with the communications network and acquires the testability data 74. The Test Manager module 20 then returns the testability data 74 to the test system 78. FIG. 9 shows the Test Manager module 20 may alternatively acquire the testability data 74 from the work order database 86. The Test Manager 20 may quickly check the work order database 86 for a recently-created work order already having the testability data 74. The Test Manager 20 communicates with the communications network, acquires the testability data 74, and then returns the testability data 74 to the test system 78.

Figure 10:
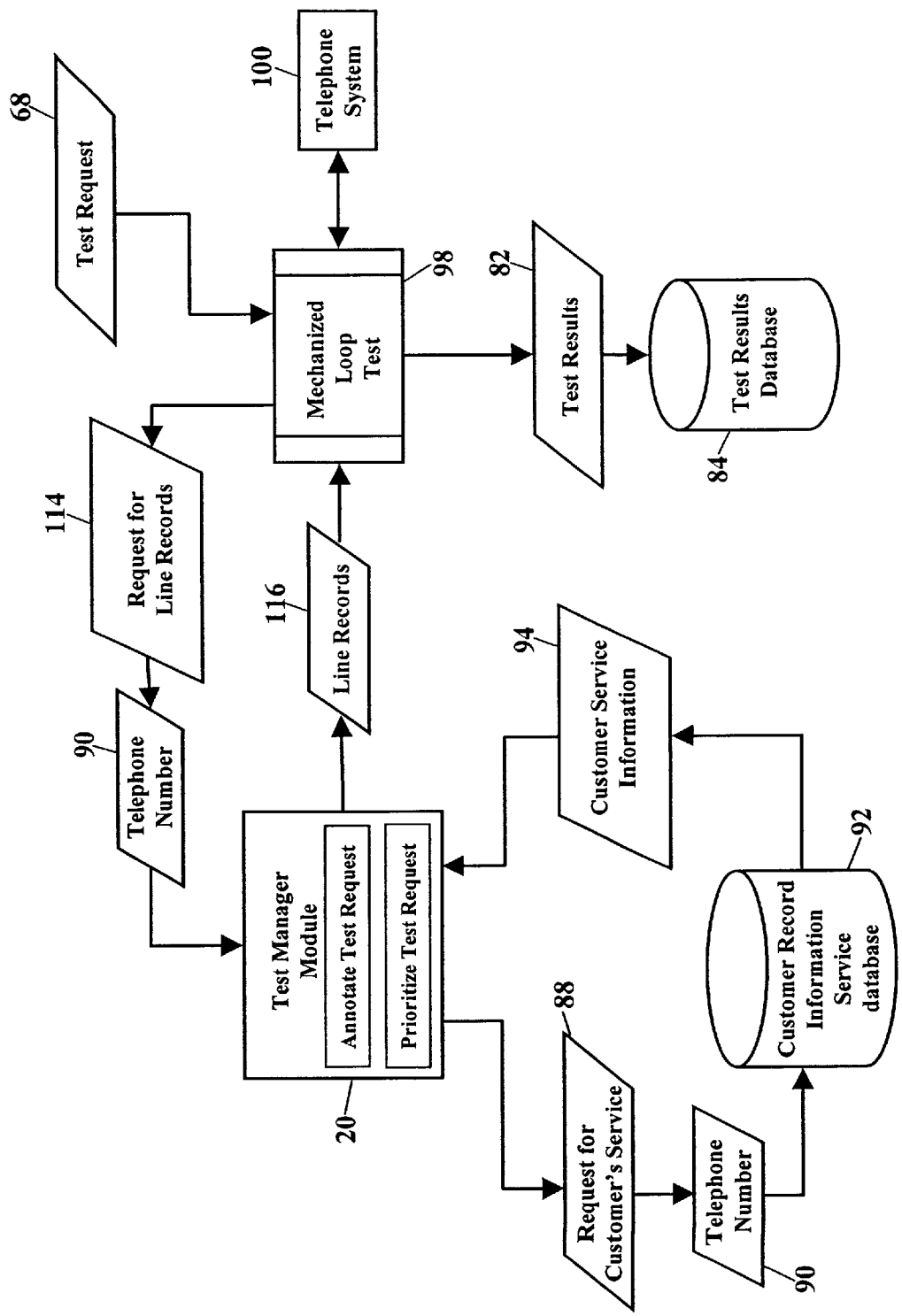
Figure 11:
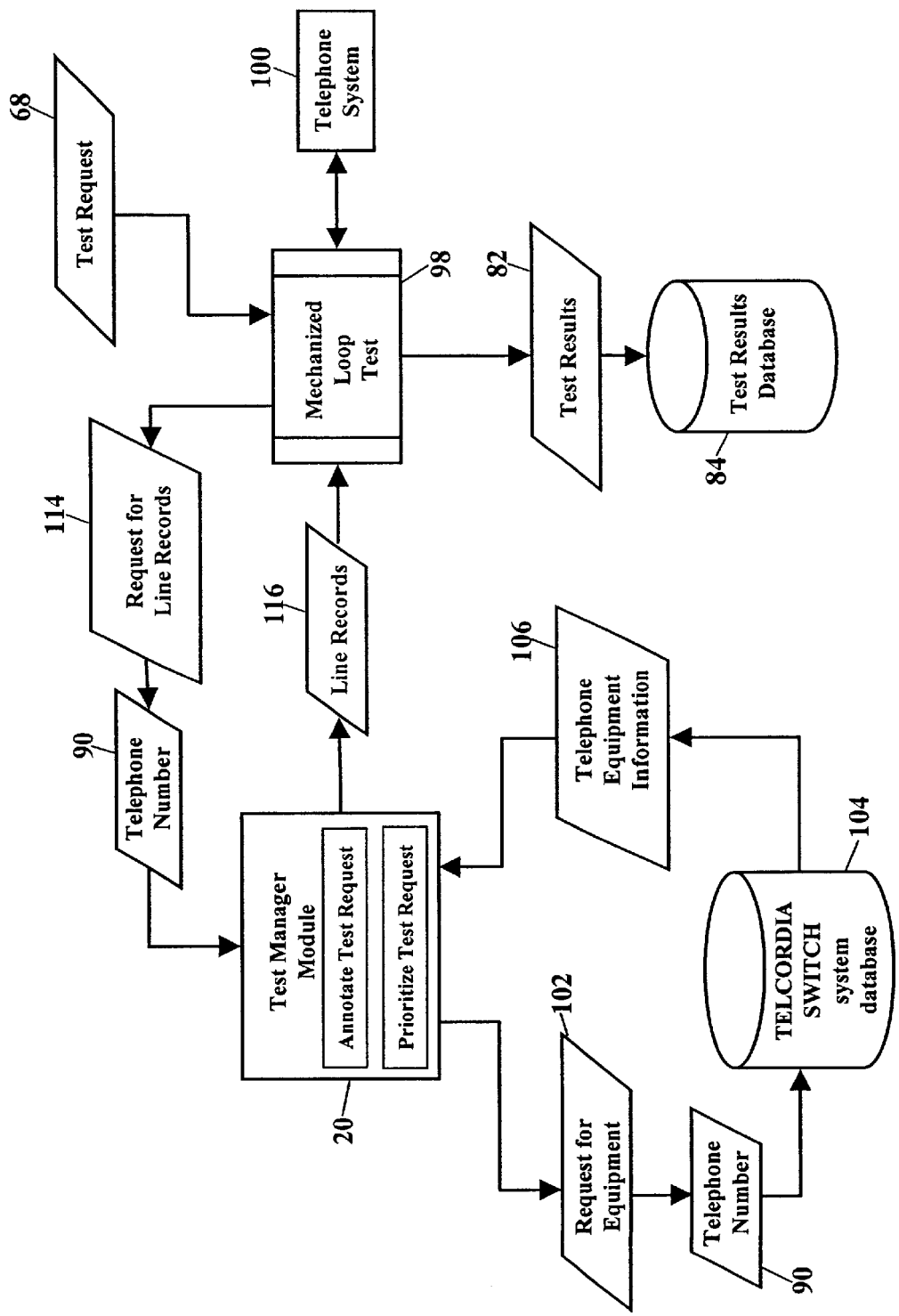
Figure 12:
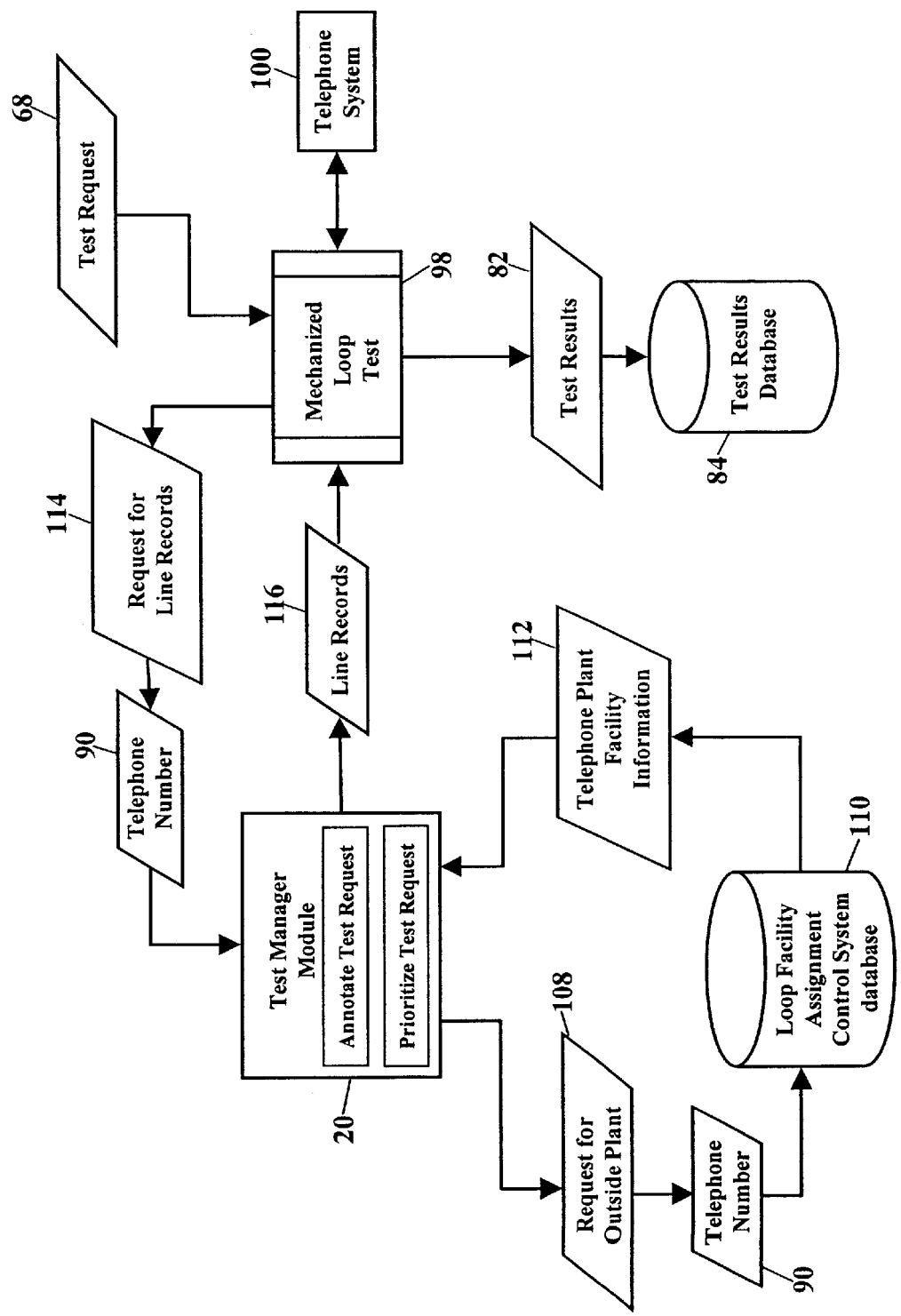

FIGS. 10–12 are block diagrams showing more alternative embodiments of the Test Manager module 20. These alternative embodiments, like those shown in FIGS. 5—7, are configured for acquiring telephone line records for the mechanized loop test 98. As FIG. 10 shows, the test request 68 is received by the mechanized loop test 98. If the mechanized loop test 98 requires fresh telephone line records, the mechanized loop test 98 issues a request 114 for telephone line records. The request 114 for telephone line records could include the telephone number 90 for which the telephone line records are sought. The Test Manager module 20 communicates with the communications network (shown as reference numeral 48 in FIG. 2) and acquires the request 114 for telephone line records. The Test Manager module 20 may, as before, annotate the request 114 for telephone line records with at least one of the date, the time, and the originating user or system of the test request 68. The Test Manager could also use the annotated date, time, or originator to prioritize multiple requests. FIG. 10 shows the Test Manager module 20 issuing the request 88 for the customer's service. This request 88 for the customer's service may also contain the telephone number 90 for which the customer's service information is sought. The request 88 for the customer's service is communicated over the communication network to the Customer Record Information Service (CRIS) database 92. The Customer Record Information Service database 92 retrieves the customer service information 94 associated with the telephone number 90. The Test Manager module 20 acquires the customer service information 94, assembles a line record 116 from the service information 94, and returns the line record 116 to the mechanized loop test 98.

FIGS. 11 and 12, likewise, show the Test Manager module 20 acquiring additional information to assemble the line record 116. FIG. 11 shows the Test Manager module 20 issuing the request 102 for equipment associated with the telephone number 90. The request 102 for equipment is communicated over the communication network (shown as reference numeral 48 in FIG. 2) to the switch system database 104. The switch system database 104 retrieves the telephone equipment information 106 associated with the telephone number 90. The Test Manager module 20 acquires the telephone equipment information 106 and assembles the line record 116. FIG. 12 shows the Test Manager module 20 issuing the request 108 for outside local loop plant facility information associated with the telephone number 90. The request 108 for outside local loop plant facility information is communicated over the communication network to the Loop Facility Assignment Control System (LFACS) 110. The Loop Facility Assignment Control System 110 retrieves the telephone plant facility information 112 associated with the telephone number 90. The Test Manager module 20 acquires the telephone plant facility information 112 and assembles the line record 116.

Figure 13:
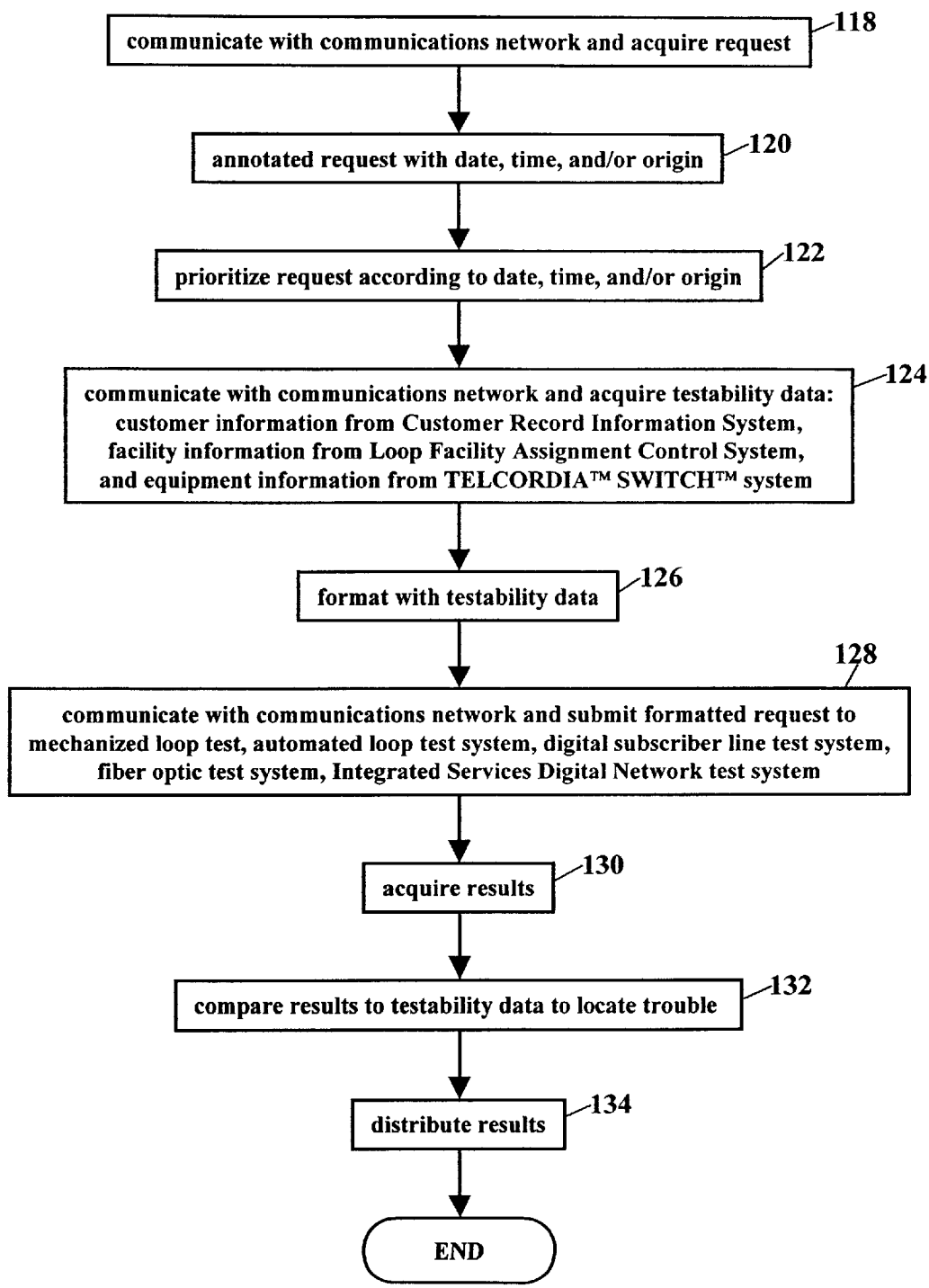
FIG. 13 is a flowchart describing a process of managing a request for a test of a communication system.

FIG. 13 is a flowchart describing a process of managing a request for a test of a communication system. The flowchart describes communicating with a communications network and acquiring the request (Block 118). The request may be annotated with at least one of a date, a time, and an origin of the request (Block 120). The request may then be prioritized according to at least one of the date, the time, and the origin of the request (Block 122). If testability data is required, the process communicates with the communications network and acquires the testability data (Block 124). The testability data may include customer information from a Customer Record Information System, facility information from a Loop Facility Assignment Control System, and equipment information from a switch system. The request is formatted with the testability data desired by a test system conducting the test of the communication system (Block 126). The process communicates with the communications network and submits the formatted request to the test system (Block 128). The test system could include a mechanized loop test, an automated loop test system, a digital subscriber line test system, a fiber optic test system, an Integrated Services Digital Network test system, or any other communication test system. The results of the test are acquired (Block 130) and compared to the testability data to locate a trouble in the communication system (Block 132). The results are distributed along the communications network to a user or other originator (Block 134). The process thus manages requests and results for tests of the communication system.

Figure 14:
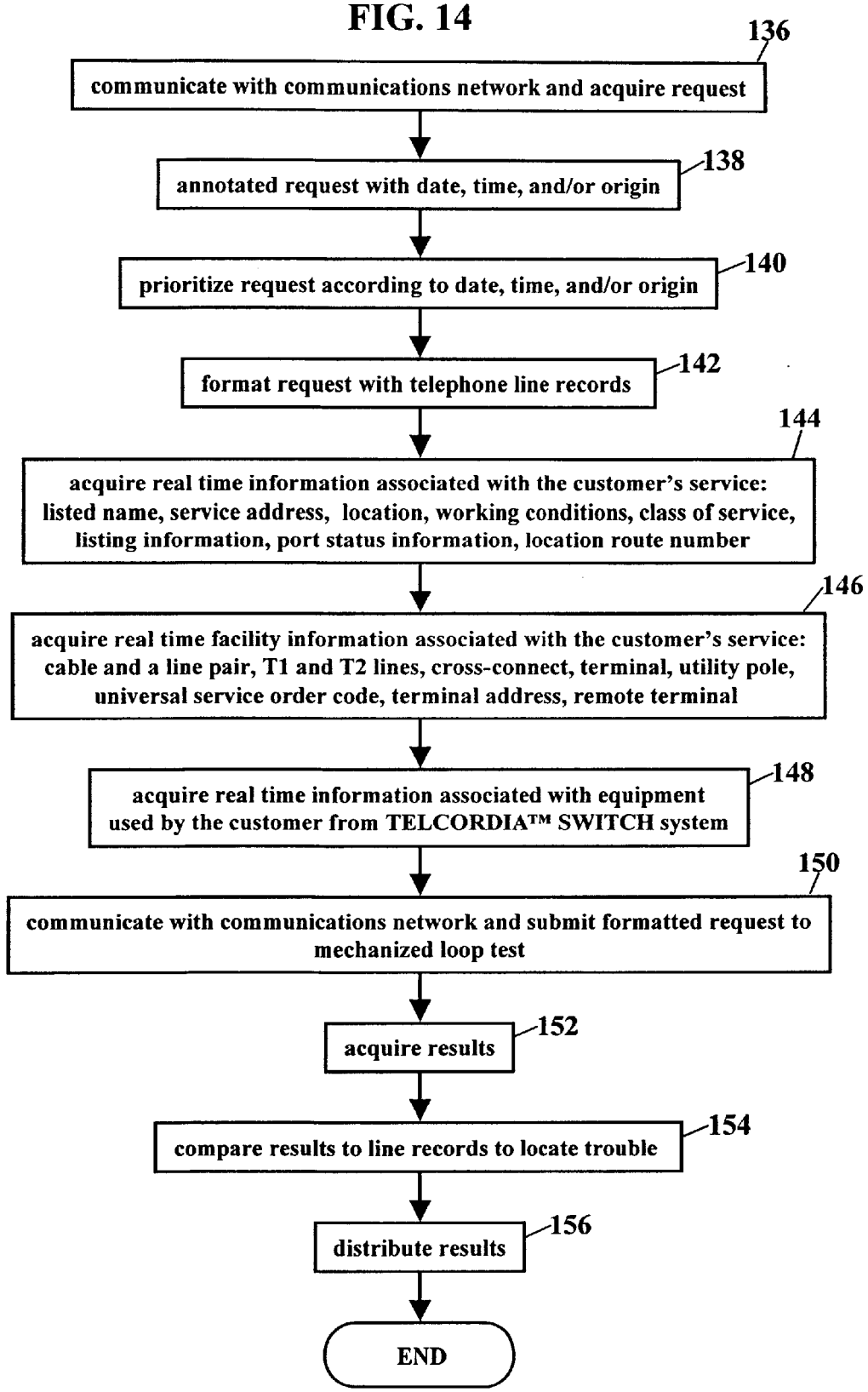
FIG. 14 is a flowchart describing an alternate process of managing a request for a mechanized loop test of a telephone system.

FIG. 14 is a flowchart describing an alternate process of managing a request for a mechanized loop test of a telephone system. The request is again acquired (Block 136) and annotated with at least one of date, time, and an origin of the request (Block 138). The request may be prioritized according to the date, time, and/or the origin (Block 140). The request is formatted with telephone line records desired by the mechanized loop test (Block 142). The telephone line records may include customer information from a Customer Record Information System (Block 144). This customer information may include listed name, address, location, working conditions, class of service, listing, location route number, and porting. The telephone line records may include facility information from a Loop Facility Assignment Control System (Block 146). The facility information may include at least one of cable information, cross-connect information, terminal information, and line pair information. The telephone line records may also include terminal equipment information from a switch system (Block 148). The formatted request is submitted over the communications network to the mechanized loop test (Block 150). The results of the mechanized loop test are acquired (Block 152) and compared to the telephone line records to determine trouble in the telephone system (Block 154). The results are distributed along the communications network to a user or other originator (Block 156). The process thus manages communication between the request and the mechanized loop test.

Figure 15:
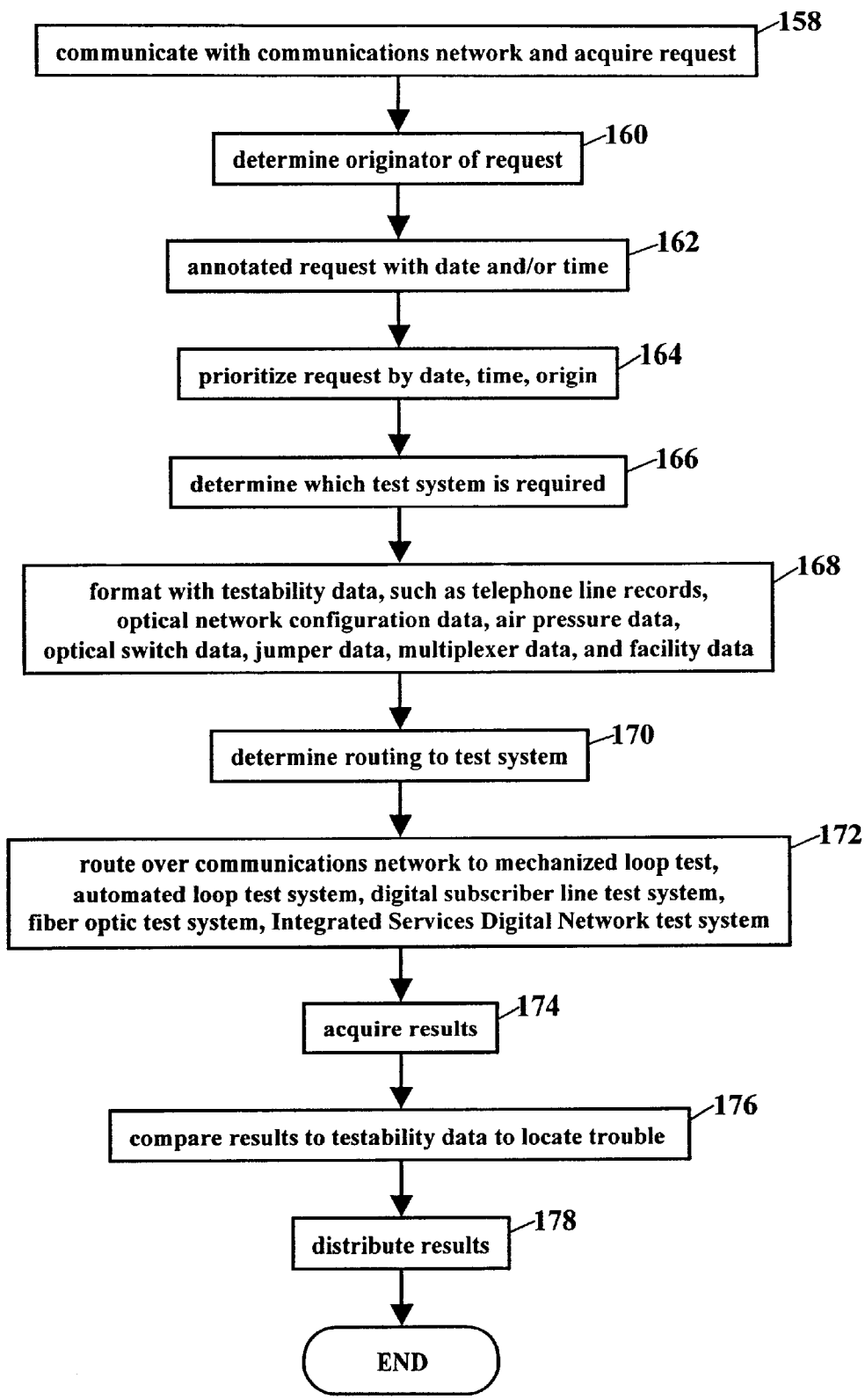
FIGS. 15–16 are flowcharts describing alternative processes of managing a request for a test of a communication system.

FIG. 15 is a flowchart showing another process of managing a request for a test of a communication system. The request is acquired (Block 158), an originator of the request is determined (Block 160), and the request may further be annotated with the date and time of the request (Block 162). If there are multiple requests, each request may be prioritized according to the date, the time, and/or the originator of the request (Block 164). Because there may be multiple, different tests systems, the process determines which test system is required to conduct the test (Block 166). Once the test system is determined, the request is formatted with testability data required by the test system (Block 168). A routing to the desired test system is determined (Block 170). The request is then routed over the communications network to the test system (Block 172). The results of the test are acquired (Block 174) and compared to the testability data to determine trouble in the communication system (Block 176). The results may then be distributed over the communications network (Block 178).

Figure 16:
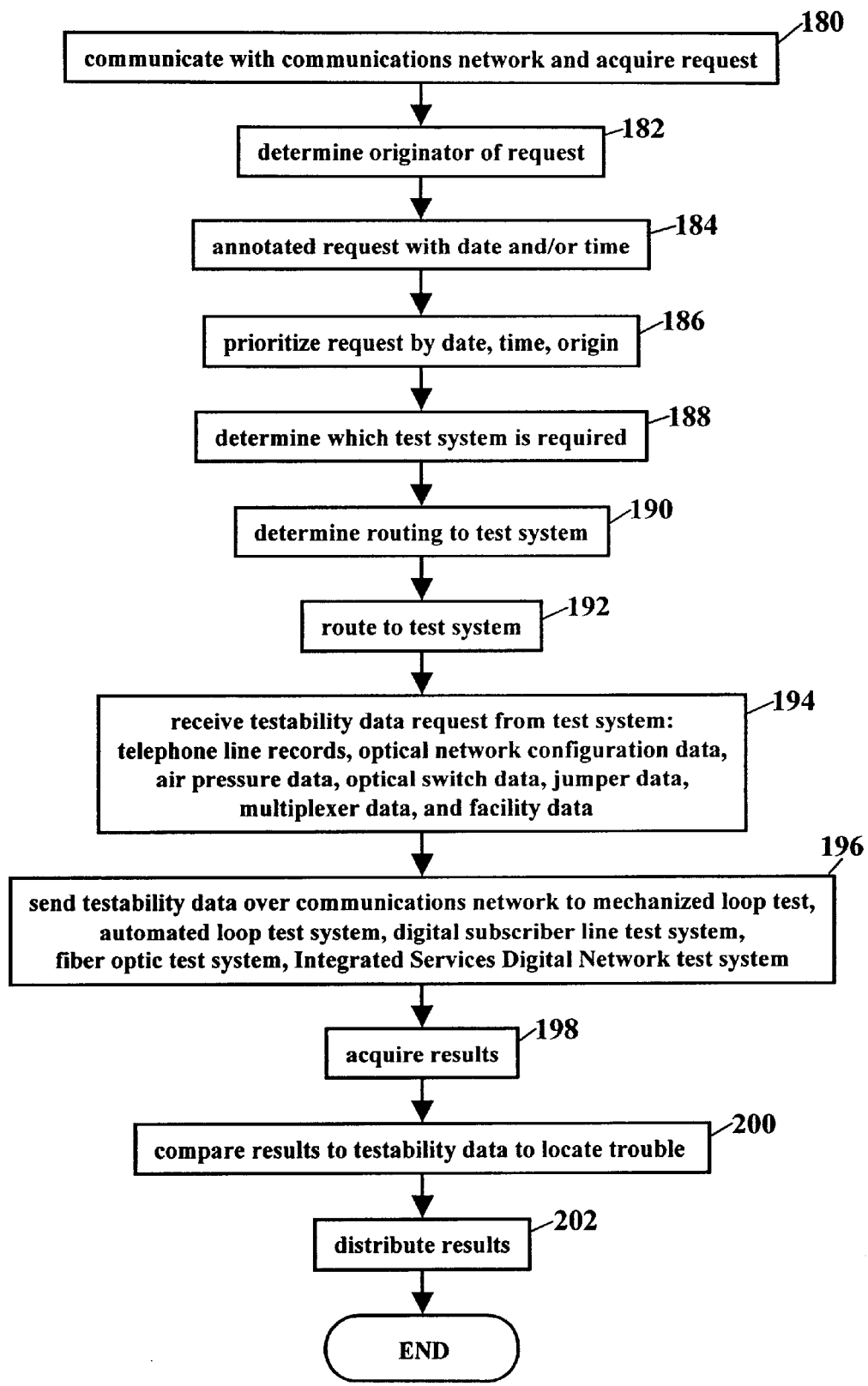

FIG. 16 is a flowchart describing still another process of managing a request for a test of a communication system. The request is acquired (Block 180) and an originator of the request of the request is determined (Block 182). The request may also be annotated with a date and a time of the request (Block 184). Multiple requests may be prioritized according to the date, time, and/or the originator (Block 186). The requested test system is determined (Block 188), and a routing to that test system is also determined (Block 190). The request is then routed to the test system (Block 192). Here, however, because the request was routed without testability data, a testability data request from the test system is received (Block 194). The testability data request requests testability data required by the test system. The requested testability data is then communicated over the communications network to the test system (Block 196). The test system performs the test and the results of the test are acquired (Block 198). The results are compared to the testability data (Block 200) and distributed (Block 202).

The Test Manager module (shown as reference numeral 20 in FIGS. 1–12) may be physically embodied on or in a computer-readable medium. This computer-readable medium may include a CD-ROM, DVD, tape, cassette, floppy disk, memory card, and a large-capacity disk (such as IOMEGA®, ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the Test Manager module to be easily disseminated. A computer program product, for managing a request for a mechanized loop test of a telephone system, includes the computer-readable medium and the Test Manager module. The Test Manager module is stored on the medium. The Test Manager module communicates with a communications network and acquiring the request. The Test Manager module prioritizes the request according to at least one of a date, a time, and an origin of the request. The Test Manager module submits the request to the mechanized loop test, and the Test Manager module distributing results of the mechanized loop test.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A process of managing a request for a test of a communication system, the process comprising:
    communicating with a communications network and acquiring the request;
    annotating the request with a date, a time, and an origin of the request;
    prioritizing the request according to the date, the time and the origin of the request;
    acquiring testability data from a work order database, the testability data being dynamically updated and specific to a test system;
    formatting the request with the testability data;
    conducting the test of the communication system;
    communicating with the communications network and submitting the formatted request to the, test system;
    communicating with the communications network and acquiring results of the test; and
    communicating with the communications network and distributing the results,
    wherein the process manages requests and results for tests of the communication system.

2. A process of managing a request according to claim 1, wherein formatting the request with the testability data comprises formatting the request with telephone line records.

3. A process of managing a request according to claim 1, wherein submitting the formatted(d request to the test system comprises submitting the formatted request to a mechanized loop test.

4. A process of managing a request according to claim 1, wherein submitting the formatted request to the test system comprises submitting the formatted request to all automated local loop test system.

5. A process of managing a request according to claim 1, wherein submitting the formatted request to the test system comprises submitting the formatted request to a digital subscriber line test system.

6. A process of managing a request according to claim 1, wherein submitting the formatted request to the test system comprises submitting the formatted request to a fiber optic test system.

7. A process of managing a request according to claim 1, wherein submitting the formatted request to the test system comprises submitting the formatted request to an Integrated Services Digital Network test system.

8. A process of managing a request according to claim 1, further comprising comparing the results to the testability data to locate a trouble in the communication system.

9. A process of managing a request according to claim 1, wherein acquiring the testability data comprises acquiring customer information from a Customer Record Information System.

10. A process of managing a request according to claim 1, wherein acquiring the testability data comprises acquiring facility information from a Loop Facility Assignment Control System.

11. A process of managing a request according to claim 1, wherein acquiring the testability data comprises acquiring equipment information from a switch system.

12. A process of managing a request according to claim 1, wherein distributing the results comprises distributing the results to the origin.

13. A process of managing a request for a mechanized loop test of a telephone system, the process comprising:
    communicating with a communications network and acquiring the request;
    annotating the request with a date, a time, and an origin of the request;
    prioritizing the request according to the date, the time, and the origin;
    acquiring telephone line records from a work order database, the telephone line records being dynamically updated and specific to the mechanized loop test;
    formatting the request with the telephone line records;
    communicating with the communications network and submitting the formatted request to the mechanized loop test;
    communicating with the communications network and acquiring results of the mechanized loop test; and
    communicating with the communications network and distributing the results,
    wherein the process manages communication between the request and the mechanized loop test.

14. A process of managing a request according to claim 13, wherein acquiring telephone line records comprises acquiring customer information from a Customer Record Information System.

15. A process of managing a request according to claim 14, wherein acquiring customer information from the Customer Record Information System comprises acquiring information associated with at least one of listed name, address, location, and working conditions.

16. A process of managing a request according to claim 14, wherein acquiring customer information from the Customer Record Information System comprises acquiring information associated with at least one of class of service, listing, location route number, and porting.

17. A process of managing a request according to claim 13, wherein acquiring telephone line records comprises acquiring facility information from a Loop Facility Assignment Control System.

18. A process of managing a request according to claim 17, wherein acquiring facility information from a Loop Facility Assignment Control System comprises acquiring at least one of cable information, cross-connect information, terminal information, and line pair information.

19. A process of managing a request according to claim 13, wherein acquiring telephone line records comprises acquiring equipment information from a switch system.

20. A process of managing a request according to claim 19, wherein acquiring equipment information from the switch system comprises acquiring information associated with terminal equipment.

21. A process of managing a request according to claim 13, wherein distributing the results comprises communicating the results to the origin.

22. A process of managing a request according to claim 13, further comprising comparing the results to the telephone line records to determine trouble in the telephone system.

23. A process of managing a request for a test of a communication system, the process comprising:
    communicating with a communications network and acquiring the request;
    determining an originator of the request by annotating the request with a date, a time, and an origin of the request;
    determining which test system is required to conduct the test;
    prioritizing the request according to the date, the time, and the origin of the request;
    acquiring testability data from a work order database, the testability data being dynamically updated and specific to a test system;
    formatting the request with the testability data;
    determining a routing to the test system;
    communicating with the communications network and routing the request to the test system;
    communicating with the communications network and acquiring results of the test;
    comparing the results to the testability data to determine trouble in the communication system; and
    communicating with the communications network and distributing the results,
    wherein the process manages requests and results for tests of the communication system.

24. A process of managing a request according to claim 23, wherein formatting the request with the testability data comprises formatting the request with the testability data specific to a mechanized loop test.

25. A process of managing a request according to claim 23, wherein formatting the request with the testability data comprises formatting the request with the testability data specific to an automated local loop test system.

26. A process of managing a request according to claim 23, wherein formatting the request with the testability data comprises formatting the request with the testability data specific to a digital subscriber line test system.

27. A process of managing a request according to claim 23, wherein formatting the request with the testability data comprises formatting the request with the testability data specific to a fiber optic test system.

28. A process of managing a request according to claim 23, wherein formatting the request with the testability data comprises formatting the request with the testability data specific to an Integrated Services Digital Network test system.

29. A process of managing a request according to claim 23, wherein formatting the request with the testability data comprises formatting the request with the telephone line records.

30. A process of managing a request according to claim 23, wherein formatting the request with the testability data comprises formatting the request with at least one of optical network configuration data, air pressure data, optical switch data, jumper data, multiplexer data, and facility data.

31. A process of managing a request for a mechanized loop test of a telephone system, the process comprising:
    communicating with a communications network and acquiring the request;
    determining a date, a time, and an originator of the request;
    prioritizing the request according to the date, the time, and the originator or the request;
    acquiring telephone line record data from a work order database, the telephone line record data being dynamically updated and specific to the mechanized loop test;
    formatting the request with the telephone line record data;
    determining a routing to the mechanized loop test;
    communicating with the communications network and routing the request to the mechanized loop test;
    communicating with the communications network and acquiring results of the mechanized loop test;
    comparing the results to the telephone line record data to determine trouble in the telephone system; and
    communicating with the communications network and distributing the results,
    wherein the process manages requests and results for mechanized loop tests of the telephone system.

32. A process of managing a request according to claim 31, wherein acquiring telephone line record data comprises acquiring customer information from a Customer Record Information System.

33. A process of managing a request according to claim 31, wherein acquiring telephone line record data comprises acquiring facility information from a loop Facility Assignment Control System.

34. A process of managing a request according to claim 31, wherein acquiring telephone line record data comprises acquiring equipment information from a switch system.

35. A process of managing a request for a test of a communication system, the process comprising:
    communicating with a communications network and acquiring the request;
    determining an originator of the request;
    determining which test system is required to conduct the test;
    determining a routing to the test system;
    communicating with the communications network and routing the request to the test system;
    communicating with the communications network and receiving a testability data request from the test system, the testability data request requesting testability data specific to the test system;
    communicating with the communications network, and sending the dynamically-updated testability data to the test system;
    communicating with the communications network and acquiring results of the test;
    comparing the results to the testability data to determine trouble in the communication system; and
    communicating with the communications network and distributing the results,
    wherein the process manages requests and results for tests of the communication system.

36. A process of managing a request according to claim 35, wherein communicating with the communications network and sending the testability data to the test system comprises sending the testability data specific to a mechanized loop test.

37. A process of managing a request according to claim 35, wherein communicating with the communications network and sending the testability data to the test system comprises sending the testability data specific to an automated local loop test system.

38. A process of managing a request according to claim 35, wherein communicating with the communications network and sending the testability data to the test system comprises sending the testability data specific to a digital subscriber line test system.

39. A process of managing a request according to claim 35, wherein communicating with the communications network and sending the testability data to the test system comprises sending the testability data specific to a fiber optic test system.

40. A process of managing a request according to claim 35, wherein communicating with the communications network and sending the testability data to the test system comprises sending the testability data specific to an Integrated Services Digital Network test system.

41. A process of managing a request according to claim 35, wherein communicating with the Communications network and sending the testability data to the test system comprises sending telephone line records.

42. A process of managing a request according to claim 35, wherein communicating with the communications network and sending the testability data to the test system comprises sending at least one of optical network configuration data, air pressure data, optical switch data, jumper data, multiplexer data, and facility data.

43. A process of managing a request for a mechanized loop test of a telephone system, the process comprising:

communicating with at communications network and acquiring the request;

determining an originator of the request;

determining a routine to the mechanized loop test;

annotating the request with a date and a time of the request;

prioritizing the request according to the date, the time, and the originator of the request;

communicating with the communications network and routing the request to the mechanized loop test;

communicating with the communications network and receiving a line records request from the mechanized loop test, the line records request requesting telephone line records specific to the mechanized loop test;

communicating with the communications network, and sending the dynamically-updated telephone line records to the mechanized loop test;

communicating with the communications network and acquiring result of the mechanized loop test;

comparing the results to the telephone line records to determine trouble in the telephone system; and communicating with the communications network and distributing the results, wherein the process manages requests and results for mechanized loop tests of the telephone system.

44. A system for managing a request for a mechanized loop test of a telephone system, the system comprising:

a Test Manager module communicating with a communications network and acquiring the request, the Test Manager module prioritizing the request according to a date, a time, and an origin of the request, the Test Manager module acquiring telephone line record data specific to the mechanized loop test from the work order database and formatting the request with the dynamically-updated telephone line record data; the Test Manager module submitting the request to the mechanized loop test; and the Test Manager module distributing results of the mechanized loop test; and a processor capable of processing the acquired request and of controlling the request and the results.

45. A computer program product for managing a request for a mechanized loop test of a telephone system, comprising:

a computer-readable medium; and a Test Manager module stored on the medium; the Test Manager module communicating with a communications network and acquiring the request, the Test Manager module prioritizing the request according to a date, a time, and an origin of the request, the Test Manager module acquiring telephone line record data specific to the mechanized loop test from a work order database and formatting the request with the dynamically-updated telephone line record data; the Test Manager module submitting the request to the mechanized loop test; and the Test Manager module distributing results of the mechanized loop test.

* * * * *